US007656350B2

(12) United States Patent
Abraham

(10) Patent No.: US 7,656,350 B2
(45) Date of Patent: Feb. 2, 2010

(54) METHOD AND APPARATUS FOR PROCESSING A SATELLITE POSITIONING SYSTEM SIGNAL USING A CELLULAR ACQUISITION SIGNAL

(75) Inventor: Charles Abraham, Los Gatos, CA (US)

(73) Assignee: Global Locate

( * ) Notice: Subject to any disclaimer, the term of this patent is extended or adjusted under 35 U.S.C. 154(b) by 135 days.

(21) Appl. No.: 10/926,792

(22) Filed: Aug. 26, 2004

(65) Prior Publication Data

US 2009/0315768 A1 Dec. 24, 2009

Related U.S. Application Data

(63) Continuation-in-part of application No. 09/993,335, filed on Nov. 6, 2001, now Pat. No. 7,053,824.

(51) Int. Cl.
*G01S 5/14* (2006.01)
(52) U.S. Cl. .................. 342/357.09; 342/357.1
(58) Field of Classification Search .................. None
See application file for complete search history.

(56) References Cited

U.S. PATENT DOCUMENTS

| 4,445,118 | A | * | 4/1984 | Taylor et al. ........... 342/357.09 |
| 4,894,662 | A | | 1/1990 | Counselman |
| 5,043,736 | A | | 8/1991 | Darnell et al. ............ 342/357 |
| 5,223,844 | A | | 6/1993 | Mansell et al. ............ 342/357 |
| 5,365,450 | A | | 11/1994 | Schuchman et al. |
| 5,408,237 | A | | 4/1995 | Patterson et al. |
| 5,417,217 | A | | 5/1995 | Morita et al. |
| 5,418,537 | A | | 5/1995 | Bird ......................... 342/357 |
| 5,430,657 | A | | 7/1995 | Kyrtsos |
| 5,506,781 | A | | 4/1996 | Cummiskey et al. |
| 5,589,833 | A | | 12/1996 | Randall et al. ............ 342/195 |
| 5,663,735 | A | | 9/1997 | Eshenbach |
| 5,673,256 | A | | 9/1997 | Maine |

(Continued)

FOREIGN PATENT DOCUMENTS

CA 2177310 12/1996

(Continued)

OTHER PUBLICATIONS

Djuknic, Goran et al, "Geolocation and Assited GPS," Computervol. 34, Issue 2, Feb. 2001, pp. 123-125.*

(Continued)

*Primary Examiner*—Gregory C Issing
(74) *Attorney, Agent, or Firm*—McAndrews Held & Malloy, Ltd.

(57) ABSTRACT

Method and apparatus for processing satellite positioning system signals is described. In one example, assistance data is received at a mobile receiver from a first wireless network using a wireless transceiver. The first wireless network may be a non-synchronized cellular network. A time synchronization signal is obtained from a second wireless network at the mobile receiver using a wireless receiver. A time offset is then determined in response to the time synchronization signal. Satellite signals are processed at the mobile receiver using the assistance data and the time offset. The second wireless network may be a synchronized cellular network or may be a non-synchronized cellular network that is externally synchronized to GPS time.

24 Claims, 4 Drawing Sheets

U.S. PATENT DOCUMENTS

| | | | |
|---|---|---|---|
| 5,726,893 | A | 3/1998 | Schuchman et al. |
| 5,786,789 | A | 7/1998 | Janky .................. 342/357 |
| 5,828,336 | A | 10/1998 | Yunck et al. |
| 5,841,396 | A | 11/1998 | Krasner |
| 5,845,227 | A | 12/1998 | Peterson .................. 701/209 |
| 5,877,724 | A | 3/1999 | Davis .................. 342/357 |
| 5,913,170 | A | 6/1999 | Wortham .................. 455/457 |
| 5,938,721 | A | 8/1999 | Dussell et al. |
| 5,943,014 | A | 8/1999 | Gilhousen .................. 342/465 |
| 5,963,167 | A | 10/1999 | Lichten et al. |
| 5,983,109 | A | 11/1999 | Montoya |
| 5,999,124 | A | 12/1999 | Shenblat et al. ........ 342/357.09 |
| 6,064,336 | A | 5/2000 | Krasner |
| 6,067,045 | A * | 5/2000 | Castelloe et al. ....... 342/357.09 |
| 6,081,229 | A | 6/2000 | Soliman et al. ........ 342/357.05 |
| 6,084,544 | A | 7/2000 | Camp, Jr. ............... 342/357.15 |
| 6,097,974 | A | 8/2000 | Camp, Jr. et al. ............ 455/575 |
| 6,107,960 | A | 8/2000 | Krasner ................. 342/357.09 |
| 6,121,923 | A | 9/2000 | King ..................... 342/357.12 |
| 6,122,506 | A | 9/2000 | Lau et al. |
| 6,131,067 | A | 10/2000 | Girerd et al. ................. 701/213 |
| 6,133,874 | A * | 10/2000 | Krasner ................. 342/357.15 |
| 6,134,483 | A | 10/2000 | Vayanos et al. |
| 6,150,980 | A | 11/2000 | Krasner .................. 342/357.1 |
| 6,178,195 | B1 * | 1/2001 | Durboraw et al. .......... 375/136 |
| 6,188,351 | B1 | 2/2001 | Bloebaum .............. 342/357.15 |
| 6,204,808 | B1 | 3/2001 | Bloebaum et al. |
| 6,211,819 | B1 | 4/2001 | King |
| 6,215,441 | B1 | 4/2001 | Moeglein et al. ....... 342/357.01 |
| 6,215,442 | B1 | 4/2001 | Shenblat et al. ........ 342/357.06 |
| 6,222,483 | B1 | 4/2001 | Twitchell et al. ....... 342/357.09 |
| 6,239,742 | B1 | 5/2001 | Krasner ................. 342/357.02 |
| 6,256,475 | B1 * | 7/2001 | Vannucci .................. 455/12.1 |
| 6,272,316 | B1 | 8/2001 | Wiedeman et al. |
| 6,285,315 | B1 | 9/2001 | Pratt ..................... 342/357.09 |
| 6,289,279 | B1 | 9/2001 | Ito et al. ..................... 701/213 |
| 6,295,023 | B1 * | 9/2001 | Bloebaum .............. 342/357.06 |
| 6,313,787 | B1 * | 11/2001 | King et al. ............. 342/357.03 |
| 6,323,804 | B1 * | 11/2001 | Kurby et al. ........... 342/357.06 |
| 6,369,751 | B1 | 4/2002 | Naruse |
| 6,377,585 | B1 | 4/2002 | Funderburk et al. |
| 6,411,892 | B1 | 6/2002 | van Diggelen |
| 6,411,899 | B2 | 6/2002 | Dussell et al. |
| 6,433,735 | B1 | 8/2002 | Bloebaum et al. |
| 6,453,237 | B1 | 9/2002 | Fuchs et al. |
| 6,542,820 | B2 | 4/2003 | LaMance et al. |
| 6,642,884 | B2 | 11/2003 | Bryant et al. |
| 6,693,882 | B1 | 2/2004 | Gu et al. |
| 6,725,159 | B2 | 4/2004 | Krasner |
| 6,799,116 | B2 | 9/2004 | Robbins |
| 6,813,560 | B2 | 11/2004 | van Diggelen et al. |
| 6,856,282 | B2 | 2/2005 | Mauro et al. |
| 2002/0032526 | A1 | 3/2002 | van Diggelen |
| 2002/0049536 | A1 | 4/2002 | Gaal |
| 2002/0172313 | A1 | 11/2002 | Smith et al. |
| 2002/0188403 | A1 | 12/2002 | LaMance et al. |
| 2002/0198657 | A1 | 12/2002 | Robbins |
| 2003/0098810 | A1 | 5/2003 | Lee et al. |
| 2003/0212821 | A1 | 11/2003 | Gillies et al. |
| 2003/0223422 | A1 | 12/2003 | Igarashi et al. |
| 2004/0203853 | A1 | 10/2004 | Sheynblat |
| 2004/0203915 | A1 | 10/2004 | van Diggelen et al. |
| 2005/0003833 | A1 | 1/2005 | Younis |

FOREIGN PATENT DOCUMENTS

| | | |
|---|---|---|
| EP | 1197761 A | 4/2002 |
| GB | 2307812 A | 6/1997 |
| WO | 89/12835 | 12/1989 |
| WO | WO-9809181 A1 | 3/1998 |
| WO | 99/19743 | 4/1999 |
| WO | WO-0175473 A2 | 10/2001 |
| WO | WO-02/103383 | 12/2002 |

OTHER PUBLICATIONS

Dietrich, Fred et al, "The Globalstar Cellular Satellite System," IEEE Trans on Antennas and Propagation , vol. 46, No. 6, pp. 935-942.*

Sturza, Mark, "Architecture of the Teledesic Satellite System," Mar. 2003, pp. 1-7, http://www.3csysco.com/Pubs/Architecture%20of%20the%20Teledesic%20Satellite%20System.pdf#search=%22sturza%20architecture%20teledesic%22.*

Cameron, et al., "Intelligent Transportation System Mayday Becomes a Reality," Proceedings of the IEEE 1995 National Aerospace and Electronics Conference, NAECON 1995, Part vol. 1, p. 340-7.

Johnson, "Communications Technologies for Automated Dependent Surveillance," vol. 1, p. 40-4, Nov. 1995.

Makino, et al., "Development of Navigation System For the Blind Using GPS and Mobile Phone Combination," 18th Annual International Conference of the IEEE Engineering in Medicine and Biology Society, Amsterdam 1996, p. 506-507.

Sennott, et al., "A High Performance Position Tracker for Embedded Paging, Cellular Telephone, and Law Enforcement Applications," 1992 IEEE, p. 96-103.

Stewart, J., "Vehicle Location and Position Monitoring System Using Satellite Navigation and Cellular Telephone," IEEE Digest No. 112, p. 7/1-15, 1993.

Zhao, Y., "Efficient and Reliable Data Transmission for Cellular-and-GPS-Based Mayday Systems," IEEE, 1998, p. 555-559.

*PCT International Search Report of the International Searching Authority* mailed Aug. 23, 2003 for PCT Application No. PCT/US02/35311.

Dietrich, F. J., "The Globalstar Cellular Satellite System", *IEEE Transaction on Antennas and Propagation*, 46 (6), Publisher item Identifier S 0018-926X(98), (Jun. 1998), 935-942.

Van Diggelen, Frank, "Global Locate Indoor GPS Chipset & Services", JON GPS 2001. Sep. 11-14, 2001, Salt Lake City, UT. USA. (Online) Sep. 11, 2001, pp. 1515-1521, XP002358532 Retrieved from the Internet: URL:http://ww.ion.org/: (retrieved on Dec. 9, 2005)

Wheatley, C., "CDMA's Dependence on Good Timing and Related Issues", *IEEE International Frequency Control Symposium*, Qualcomm Incorporated (1996), 1211-1218.

International Search Report mailed Jul. 10, 2007 for PCT Application No. PCT/US2007/001187.

Written Opinion mailed Jul. 10, 2007 for PCT Application No. PCT/US2007/001187.

* cited by examiner

METHOD AND APPARATUS FOR PROCESSING A SATELLITE POSITIONING SYSTEM SIGNAL USING A CELLULAR ACQUISITION SIGNAL

CROSS-REFERENCE TO RELATED APPLICATIONS

This application is a continuation-in-part of U.S. patent application Ser. No. 09/993,335, filed Nov. 6, 2001, now U.S. Pat. No. 7,053,824 which is incorporated by reference herein in its entirety.

BACKGROUND OF THE INVENTION

1. Field of the Invention

Embodiments of the present invention generally relate to satellite position location systems and, more particularly, to a method and apparatus for receiving a global positioning system signal using a cellular acquisition signal.

2. Description of the Related Art

Global Positioning System (GPS) receivers use measurements from several satellites to compute position. GPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver.

More specifically, each GPS signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

GPS receivers determine the time delays between transmission and reception of the signals by comparing time shifts between the received PN code signal sequence and internally generated PN signal sequences. These measured time delays are referred to as "sub-millisecond pseudoranges", since they are known modulo the 1 millisecond PN frame boundaries. By resolving the integer number of milliseconds associated with each delay to each satellite, then one has true, unambiguous, pseudoranges. A set of four pseudoranges together with a knowledge of absolute times of transmission of the GPS signals and satellite positions in relation to these absolute times is sufficient to solve for the position of the GPS receiver. The absolute times of transmission (or reception) are needed in order to determine the positions of the GPS satellites at the times of transmission and hence to compute the position of the GPS receiver.

Accordingly, each of the GPS satellites broadcasts a model of satellite orbit and clock data known as the satellite navigation message. The satellite navigation message is a 50 bit-per-second (bps) data stream that is modulo-2 added to the PN code with bit boundaries aligned with the beginning of a PN frame. There are exactly 20 PN frames per data bit period (20 milliseconds). The satellite navigation message includes satellite-positioning data, known as "ephemeris" data, which identifies the satellites and their orbits, as well as absolute time information (also referred to herein as "GPS time" or "time-of-day") associated with the satellite signal. The absolute time information is in the form of a second of the week signal, referred to as time-of-week (TOW). This absolute time signal allows the receiver to unambiguously determine a time tag for when each received signal was transmitted by each satellite.

GPS satellites move at approximately 3.9 km/s, and thus the range of the satellite, observed from the earth, changes at a rate of at most □800 m/s. Absolute timing errors result in range errors of up to 0.8 m for each millisecond of timing error. These range errors produce a similarly sized error in the GPS receiver position. Hence, absolute time accuracy of 10 ms is sufficient for position accuracy of approximately 10 m. Absolute timing errors of much more than 10 ms will result in large position errors, and so typical GPS receivers have required absolute time to approximately 10 milliseconds accuracy or better.

Another time parameter closely associated with GPS positioning is the sub-millisecond offset in the time reference used to measure the sub-millisecond pseudorange. This offset affects all the measurements equally, and for this reason it is known as the "common mode error". The common mode error should not be confused with the absolute time error. As discussed above, an absolute time error of 1 millisecond leads to range errors of up to 0.8 meters while an absolute time error of 1 microsecond would cause an almost unobservable range error of less than 1 millimeter. A common mode error of 1 microsecond, however, results in a pseudorange error of 1 microsecond multiplied by the speed of light (i.e., 300 meters). Common mode errors have a large effect on pseudorange computations, and it is, in practice, very difficult to calibrate the common mode error. As such, traditional GPS receivers treat the common mode error as an unknown that must be solved for, along with position, once a sufficient number of pseudoranges have been measured at a particular receiver.

In some GPS applications, the signal strengths of the satellite signals are so low that either the received signals cannot be processed, or the time required to process the signals is excessive. As such, to improve the signal processing, a GPS receiver may receive assistance data from a network to assist in satellite signal acquisition and/or processing. For example, the GPS receiver may be integrated within a cellular telephone and may receive the assistance data from a server using a wireless communication network. This technique of providing assistance data to a remote receiver has become known as "Assisted-GPS" or A-GPS.

In some A-GPS systems, the wireless communication network that provides the assistance data is not synchronized to GPS time. Such non-synchronized networks include time division multiple access (TDMA) networks, such as GSM networks, universal mobile telecommunications system (UMTS) networks, North American TDMA networks (e.g., IS-136), and personal digital cellular (PDC) networks. In such systems, the GPS receiver cannot synchronize to GPS time without receiving and decoding TOW information from the satellites signals. In low signal-to-noise ratio environments, TOW information is difficult, if not impossible, to decode. Without accurate time-of-day information, the GPS receiver cannot provide an accurate time-tag for its measurements, thereby deleteriously affecting the accuracy of the position computed by the network.

Accordingly, there exists a need in the art for an A-GPS mobile receiver for non-synchronized communication networks capable of synchronizing to GPS time.

SUMMARY OF THE INVENTION

Method and apparatus for processing satellite positioning system signals is described. In one embodiment, assistance data is received at a mobile receiver from a first wireless network using a wireless transceiver. The assistance data may comprise acquisition assistance data (e.g., expected pseudorange data), satellite trajectory data (e.g., satellite ephemeris), or both. The first wireless network may be a non-synchronized cellular network. A time synchronization signal is obtained from a second wireless network at the mobile receiver using a wireless receiver. A time offset is then determined in response to the time synchronization signal. Satellite signals are processed at the mobile receiver using the assistance data and the time offset. The second wireless network may be a synchronized cellular network (e.g., a CDMA network) or may be a non-synchronized cellular network that is externally synchronized to GPS time (e.g., a GSM network having location measurement units (LMUs)). The mobile receiver is thus configured to receive the time synchronization signal without a subscription to the second wireless network, which eliminates fees for such a subscription. In addition, the circuitry required for the receive-only front end is less complex and less costly than that required for a full transceiver.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A method and apparatus for processing satellite positioning system signals is described. Those skilled in the art will appreciate that the invention may be used with various types of mobile or wireless devices that are "location-enabled," such as cellular telephones, pagers, laptop computers, personal digital assistants (PDAs), and like type wireless devices known in the art. Generally, a location-enabled mobile device is facilitated by including in the device the capability of processing satellite positioning system (SPS) satellite signals, such as Global Positioning System (GPS) signals.

Figure 1:
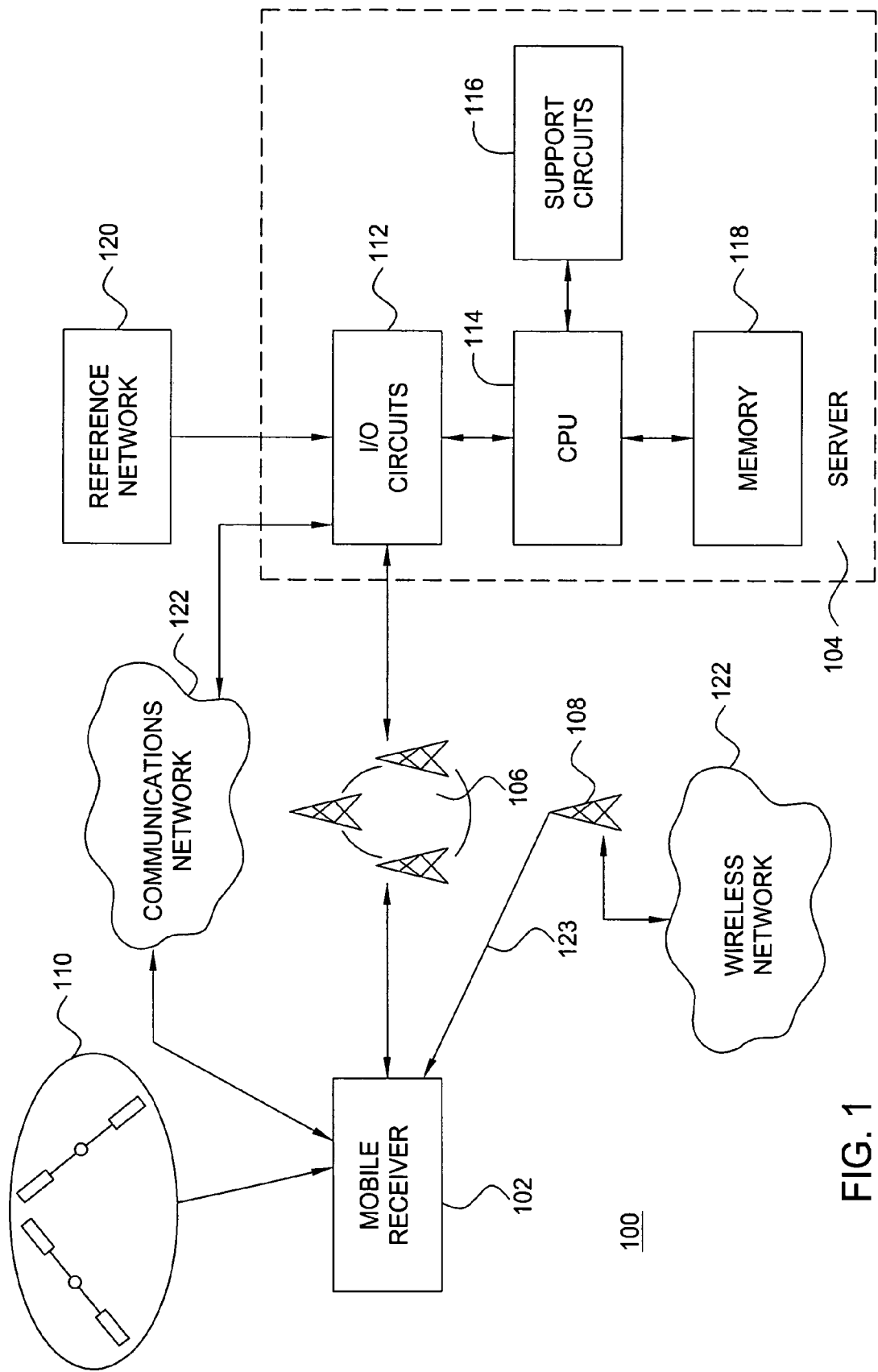
FIG. 1 is a block diagram depicting an exemplary embodiment of a position location system.

FIG. 1 is a block diagram depicting an exemplary embodiment of a position location system 100. The system 100 comprises a mobile receiver 102 in communication with a server 104 via a wireless communication network 106 (e.g., a cellular telephone network). The server 104 may be disposed in a serving mobile location center (SMLC) of the wireless communication network 106. The mobile receiver 102 obtains satellite measurement data with respect to a plurality of satellites 110 (e.g., pseudoranges, Doppler measurements). The server 104 obtains satellite navigation data for at least the satellites 110 (e.g., orbit trajectory information, such as ephemeris). Position information for the mobile receiver 102 is computed using the satellite measurement data and the satellite navigation data.

Satellite navigation data, such as ephemeris for at least the satellites 110, may be collected by a network of tracking stations ("reference network 120"). The reference network 120 may include several tracking stations that collect satellite navigation data from all the satellites in the constellation, or a few tracking stations, or a single tracking station that only collects satellite navigation data for a particular region of the world. An exemplary system for collecting and distributing ephemeris is described in commonly-assigned U.S. Pat. No. 6,411,892, issued Jun. 25, 2002, which is incorporated by reference herein in its entirety. The reference network 120 may provide the collected satellite navigation data to the server 104.

The mobile receiver 102 is configured to receive assistance data from the server 104. In one embodiment, the assistance data comprises acquisition assistance data. For example, the mobile receiver 102 may request and receive acquisition assistance data from the server 104 and send satellite measurement data to the server 104 along with a time-tag. The server 104 then locates position of the mobile receiver 102 (referred to as the mobile station assisted or "MS-assisted" configuration). Acquisition assistance data may be computed by the server 104 using satellite trajectory data (e.g., ephemeris or other satellite trajectory model) and an approximate position of the mobile receiver 102. An approximate position of the mobile receiver 102 may be obtained using various position estimation techniques known in the art, including use of transitions between base stations of the wireless communication network 106, use of a last known location of the mobile receiver 102, use of a location of a base station of the wireless communication network 106 in communication with the mobile receiver 102, use of a location of the wireless communication network 106 as identified by a network ID, or use of a location of a cell site of the wireless communication network 106 in which the mobile receiver 102 is operating as identified by a cell ID.

The acquisition assistance data includes expected pseudorange data. In one embodiment of the invention, the acquisition assistance data includes expected pseudoranges from the satellites 110 to an assumed position of the mobile receiver 102 (approximate position) at an assumed time-of-day. The expected pseudoranges may be computed using the satellite trajectory data. The details of such computations are well known in the art and, for purposes of clarity, are not repeated herein. In one embodiment, the expected pseudoranges are derived from a model that is valid over specified period of time ("pseudorange model"). The mobile receiver 102 may apply a time-of-day to the pseudorange model to extract appropriate expected pseudorange parameters. Exemplary processes for forming pseudorange models as acquisition assistance data are described in commonly-assigned U.S. Pat. No. 6,453,237, issued Sep. 17, 2002, which is incorporated by reference herein in its entirety. The expected pseudoranges or a pseudorange model may be computed by the server 104 and transmitted to the mobile receiver 102 upon request. Alternatively, if the mobile receiver 102 has obtained satellite trajectory data and an approximate position, the mobile receiver 102 may compute the expected pseudoranges or pseudorange model. That is, the mobile receiver 102 may compute expected pseudoranges or a pseudorange model using the same computation as that performed by the server 104.

In one embodiment, the acquisition assistance data may be formatted as described in ETSI TS 101 527 (3GPP TS 4.31), which is shown below in Table 1. Notably, the acquisition assistance data defined in 3GPP TS 4.31 may include a satellite vehicle identifier (SVID), zeroth and first order Doppler terms, a Doppler uncertainty, an expected code phase (e.g., sub-millisecond pseudorange), an integer code phase, a code phase search window, and expected azimuth and elevation data. The range of possible values and associated resolutions are shown for each of the parameters.

TABLE 1

| Parameter | Range | Resolution |
|---|---|---|
| SVID/PRNID | 1-64 (0-63) | n/a |
| Doppler ($0^{th}$ order term) | −5,120 Hz to 5,117.5 Hz | 2.5 Hz |
| Doppler ($1^{st}$ order term) | −1-0.5 | n/a |
| Doppler Uncertainty | 12.5 Hz-200 Hz [$2^{-n}$(200) Hz, n = 0-4] | n/a |
| Code Phase | 0-1022 chips | 1 chip |
| Integer Code Phase | 0-19 | 1 C/A period |
| GPS Bit number | 0-3 | n/a |
| Code Phase Search Window | 1-192 chips | n/a |
| Azimuth | 0-348.75 deg | 11.25 deg |
| Elevation | 0-78.75 deg | 11.25 deg |

In another embodiment, the assistance data comprises satellite trajectory data (e.g., ephemeris, Almanac, or some other orbit model). Upon request, the server 104 may transmit satellite trajectory data to the mobile receiver 102 via the wireless communication network 106. Alternatively, the mobile receiver 102 may receive satellite trajectory data via a communications network 122 (e.g., a computer network, such as the Internet). Notably, the satellite trajectory data may comprise a long term satellite trajectory model, as described in commonly-assigned U.S. Pat. No. 6,560,534, issued May 6, 2003, which is incorporated by reference herein in its entirety. Having received the satellite trajectory data, the mobile receiver 102 may locate its own position using the satellite measurement data (referred to as the "MS-Based" configuration). In addition, the mobile receiver 102 may compute its own acquisition assistance data (described above) using the satellite trajectory data.

The server 104 illustratively comprises an input/output (I/O) interface 112, a central processing unit (CPU) 114, support circuits 116, and a memory 118. The CPU 114 is coupled to the memory 118 and the support circuits 116. The memory 118 may be random access memory, read only memory, removable storage, hard disc storage, or any combination of such memory devices. The support circuits 116 include conventional cache, power supplies, clock circuits, data registers, I/O interfaces, and the like to facilitate operation of the server 104. The I/O interface 112 is configured to receive satellite navigation data from the reference network 120. The I/O interface 112 is also configured for communication with the wireless communication network 106. Various processes and methods described herein may be implemented using software stored in the memory 118 for execution by the CPU 114. Alternatively, the server 104 may implement such processes and methods in hardware or a combination of software and hardware, including any number of processors independently executing various programs and dedicated hardware, such as application specific integrated circuits (ASICs), field programmable gate arrays (FPGAs), and the like.

The mobile receiver 102 is also configured to receive one or more cellular broadcast signals 123 as a form of one-way communication from a cellular base station 108 of a cellular network 122. Notably, the base station 108 is configured to broadcast a time synchronization signal to enable the mobile receiver 102 to synchronize to the base station 108 as a first step in establishing communication with the cellular network 122. While the mobile receiver 102 is not configured to establish communication with the cellular network 122 (e.g., the mobile receiver 102 may not have a subscription to the cellular network 122), the broadcast time synchronization signal may be used as a source of time. For purposes of clarity by example, the network 122 is described as being a cellular network. It is to be understood, however, that the network 122 may comprise other types of wireless networks that broadcast acquisition signals including a time synchronization signal.

In one embodiment, the time synchronization signal includes a timing message that is related to GPS time. The timing message may be related absolutely to GPS time (e.g., the timing message may be a system time message) or may be related to a sub-millisecond portion of GPS time (e.g., the timing message may be a frame number and information relating the frame number to GPS time). In either case, information from the time synchronization signal may be used to establish a timing reference for the mobile receiver 102.

For example, the base station 108 may employ a separate synchronization channel for broadcasting a time message that contains the system time relative to timing markers in the synchronization channel. The system time may be equivalent to GPS time or may have some known relationship to GPS time. The mobile receiver 102 may derive the system time from the time synchronization signal and determine a time offset GPS time and time provided by a local clock. The time offset may be used to calibrate the local clock circuits within the mobile receiver 102, or may be used to compensate for local clock error while processing. In one embodiment, the computed time offset is further compensated to account for the distance of the mobile receiver 102 from the base station 108. This compensation makes use of a measurement of the round trip signal delay between base station 108 and the mobile receiver 102. In this manner, the mobile receiver 102 may be synchronized to GPS time.

An exemplary cellular communication network that employs such a timing synchronization signal is the North American CDMA (code division multiple access) standard (IS-95). The IS-95 system employs a separate 26.67 millisecond synchronization channel that is spread using a PN sequence of 215 chips. Additionally, the synchronization channel is modulated with a particular Walsh code, allowing it to be separated from paging and traffic channels using different Walsh codes. The synchronization channel carries a message containing a time of day relative to the frame boundaries of the synchronization channel ("CDMA system time"). The CDMA system time is precisely related to GPS time. In one embodiment, to accurately determine GPS time from the CDMA system time, the CDMA time obtained from the synchronization channel is adjusted to remove an offset that is added by the delay in the transmission of the CDMA system time from the base station 108 to the mobile receiver 102. This adjustment is made by measuring the round-trip delay for a signal being transmitted from the mobile receiver 102 to the base station 108 and back. The synchronization channel structure for the IS-95 CDMA system is well known in the art. For purposes of clarity by example, aspects of the invention are described with respect to an IS-95 CDMA system. It is to be understood, however, that the invention may be used with other types of synchronized cellular communication networks that provide time synchronization signals, such as CDMA-2000, W-CDMA, and the like.

The present invention may also be used with non-synchronized cellular communication systems that include a mechanism for relating a non-synchronized system time to GPS time, such as global system for mobile communication (GSM), universal mobile telecommunications system (UMTS), North American time division multiple access (TDMA) (e.g., IS-136), and personal digital cellular (PDC) networks. That is, the cellular network 122 may be a non-synchronized cellular network. For example, in a GSM system, the time synchronization signal comprises a synchronization burst periodically transmitted by the base station 108 and a timing message that provides a GSM time stamp associated with the synchronization burst. In some GSM networks, GSM time is not synchronized to GPS time. However, such networks may include location measurement units (LMUs). As is well known in the art, an LMU includes a GPS receiver, which is used to receive and decode time information (TOW) from the satellites in view of one or more base stations. The LMU then computes an offset value between GPS time and the time as known by the base station(s) that are near the LMU ("air-interface timing"). The offset is provided to the base station(s) for use in relating the air-interface timing to GPS time. Notably, the base station 108 may transmit an offset between its air-interface timing and GPS time to the mobile receiver 102. For example, the offset may be supplied to the mobile receiver 102 as part of an acquisition assistance data exchange as defined in 3GPP TS 4.31.

Figure 2:
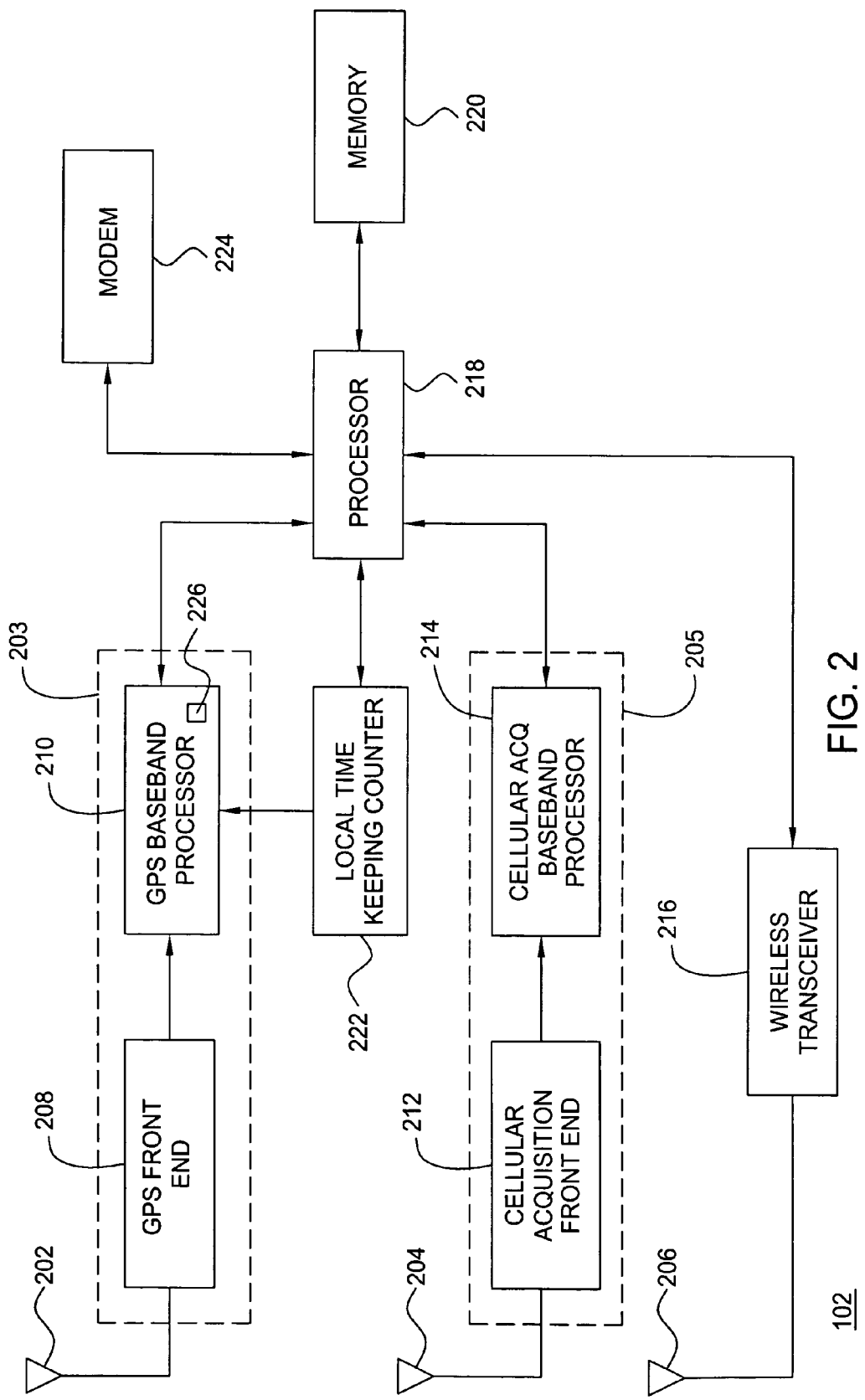
FIG. 2 is a block diagram depicting an exemplary embodiment of a mobile receiver constructed in accordance with the invention.

FIG. 2 is a block diagram depicting an exemplary embodiment of a mobile receiver 102 constructed in accordance with the invention. The mobile receiver 102 comprises a GPS receiver 203, a cellular acquisition receiver 205 (also referred to as a wireless receiver), a wireless transceiver 210, a processor 218, a memory 220, and a local time keeping counter 222 (also referred to as a local clock). The GPS receiver 203 comprises a GPS front end 208 and a GPS baseband processor 210. The GPS front end 208 filters and downconverts satellite signals received by an antenna 202 to produce a near baseband (e.g., intermediate frequency) or baseband signal. The GPS baseband processor 203 processes output from the GPS front end 208 to produce measurement data. The GPS baseband processor 203 uses a time reference generated by the local time keeping counter 222. Notably, the GPS baseband processor 203 includes correlator circuitry 226 for correlating satellite signals with corresponding reference codes to produce correlation results. Operation of the GPS front end 208, the GPS baseband processor 203, and the correlator circuitry 226 is well known in the art. For a detailed understanding of the GPS receiver 203, the reader is referred to commonly-assigned U.S. Pat. No. 6,453,237, cited above.

The cellular acquisition receiver 205 comprises a cellular acquisition front end 212 and a cellular acquisition baseband processor 214. The cellular acquisition front end 212 receives cellular acquisition signals (e.g., time synchronization signal) via an antenna 204. The cellular acquisition baseband processor 214 locks and decodes the cellular acquisition signals using, for example, conventional digital processing techniques that are well known in the design of cellular telephones. The cellular acquisition receiver 205 is configured to only receive broadcast cellular acquisition signals.

Notably, in an IS-95 CDMA compatible environment, the cellular acquisition receiver 205 detects a pilot channel of a nearby base station (e.g., the base station 108 of FIG. 1) and then proceeds to decode a synchronization channel broadcast by the base station. The cellular acquisition receiver 205 achieves synchronization to the framing of the synchronization channel and receives a time message containing a time of day relative to the frame boundaries. Since the time of day derived from the synchronization channel is related to GPS time used by the GPS satellites, the processor 218 may derive a time offset between GPS time and time provided by the local time keeping counter 222. The time offset may be further compensated for the round-trip delay of a signal communicated between the cellular acquisition receiver 205 and the base station 108. The processor 218 may calibrate the local time keeping counter 222 using the time offset. Alternatively, the processor 218 may provide the time offset to the GPS baseband processor 210 so that the GPS baseband processor 210 can compensate for clock error in the local time keeping counter 222.

In a GSM compatible environment, the mobile receiver 102 receives a time signal from the base station 108 that relates the air-interface timing of the base station 108 to GPS time. The cellular acquisition receiver 205 achieves synchronization to the framing of the GSM signal and receives a GSM time message containing a time of day relative to the frame boundaries. The processor 218 derives a time offset between GPS time and time provided by the local time keeping counter 222 using the time offset between the air-interface timing and GPS time. The processor 218 may calibrate the local time keeping counter 222 using the time offset. Alternatively, the processor 218 may provide the time offset to the GPS baseband processor 210 so that the GPS baseband processor 210 can compensate for clock error in the local time keeping counter 222. In either the CDMA or GSM environments, the mobile device 102 may use a cellular acquisition signal broadcast by the base station 108 to precisely track GPS time, typically to within a few microseconds.

The wireless transceiver 204 processes cellular signals received by an antenna 206. The wireless transceiver 204 is configured for two-way communication with a cellular network. Notably, the wireless transceiver 204 may be used to request and receive assistance data from the server 104 through the cellular network 106. The mobile receiver 102 may include a modem 224 or other type of communications transceiver for receiving data (e.g., satellite trajectory data) from a separate communications link, such as the Internet. The processor 218 may comprise a microprocessor, instruction-set processor (e.g., a microcontroller), or like type processing element known in the art. The processor 218 is coupled to the memory 220. The memory 220 may be random access memory, read only memory, removable storage, hard disc storage, or any combination of such memory devices. Various processes and methods described herein may be implemented using software stored in the memory 220 for execution by the processor 218. Alternatively, the mobile receiver 102 may implement such processes and methods in hardware or a combination of software and hardware, including any number of processors independently executing various programs and dedicated hardware, such as ASICs, FPGAs, and the like.

Figure 3:
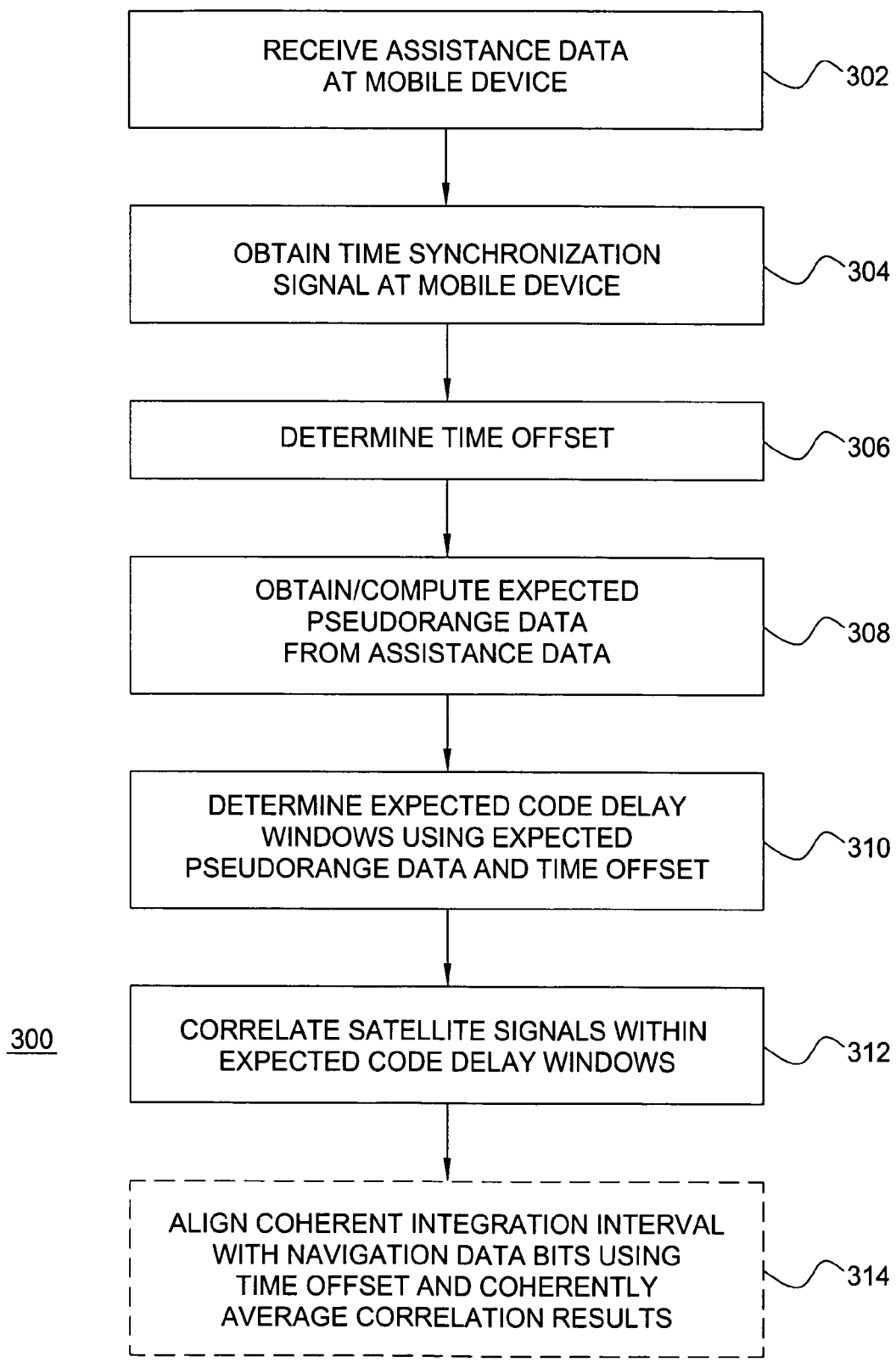
FIG. 3 is a flow diagram depicting an exemplary embodiment of a method for processing satellite positioning system signals in accordance with the invention.

FIG. 3 is a flow diagram depicting an exemplary embodiment of a method 300 for processing satellite positioning system signals in accordance with the invention. Aspects of the method 300 may be understood with simultaneous reference to FIGS. 1-3. The method 300 begins at step 302, where assistance data is received at the mobile receiver 102. At step 304, a time synchronization signal is obtained at the mobile receiver 102. The time synchronization signal is obtained using the receive-only cellular acquisition receiver 205. Thus, the mobile receiver 102 does not require a subscription to the cellular network 122 and may employ less complex and costly circuitry as compared to a full communication transceiver.

At step 306, a time offset is determined using the time synchronization signal. At step 308, expected pseudorange data is obtained or computed from the assistance data received at step 302. In one embodiment, expected pseudorange data may be extracted from acquisition assistance data (e.g., a 3GPP TS 4.31 an acquisition assistance message). In another embodiment, expected pseudorange data may be computed within the mobile receiver 102 using satellite trajectory data and an approximate location of the mobile receiver 102.

At step 310, expected code delay windows are determined using the expected pseudorange data and the time offset. Notably, the expected pseudoranges are used to provide a code delay window within which satellite signal acquisition is expected. If the local time keeping counter 222 is not calibrated to GPS time, the timing of the locally generated C/A code within the GPS baseband processor 210 is arbitrary relative to the satellite signals. In other words, there is an uncertainty component in the expected delay windows computed from the expected pseudorange data caused by the local clock error (common mode error). The time offset may be used to solve for this uncertainty component. In one embodiment, the time offset may be used in conjunction with the local time keeping counter 222 to program the starting point of locally generated reference codes relative to GPS time in order to solve for the uncertainty component. In another embodiment, the time offset may be used to calibrate the local time keeping counter 222 directly.

At step 312, satellite signals are correlated within the expected code delay windows. The correlation process is well known in the art. Optionally, the time offset determined at step 306 may be used by the mobile receiver 102 to improve a coherent averaging process performed by the correlator circuitry 226 of the GPS baseband processor 210. As is well known in the art, coherent averaging improves signal-to-noise ratio by averaging correlation results over a particular interval. The effectiveness of the coherently averaging process may be limited due to the navigation data bits that modulate the PN codes of the satellite signals. Specifically, due to the navigation data bits, a GPS signal undergoes a potential 180 degree phase transition every 20 C/A code cycles. The coherent averaging process should be synchronized to the navigation data bit timing, otherwise changing data bits may partially defeat such an averaging process. Thus, in one embodiment, the time offset computed at step 306 may be used in conjunction with the local time keeping counter 222 to control the start and stop times of coherent averaging to make the coherent averaging intervals coincident with incoming navigation data bits.

Figure 4:
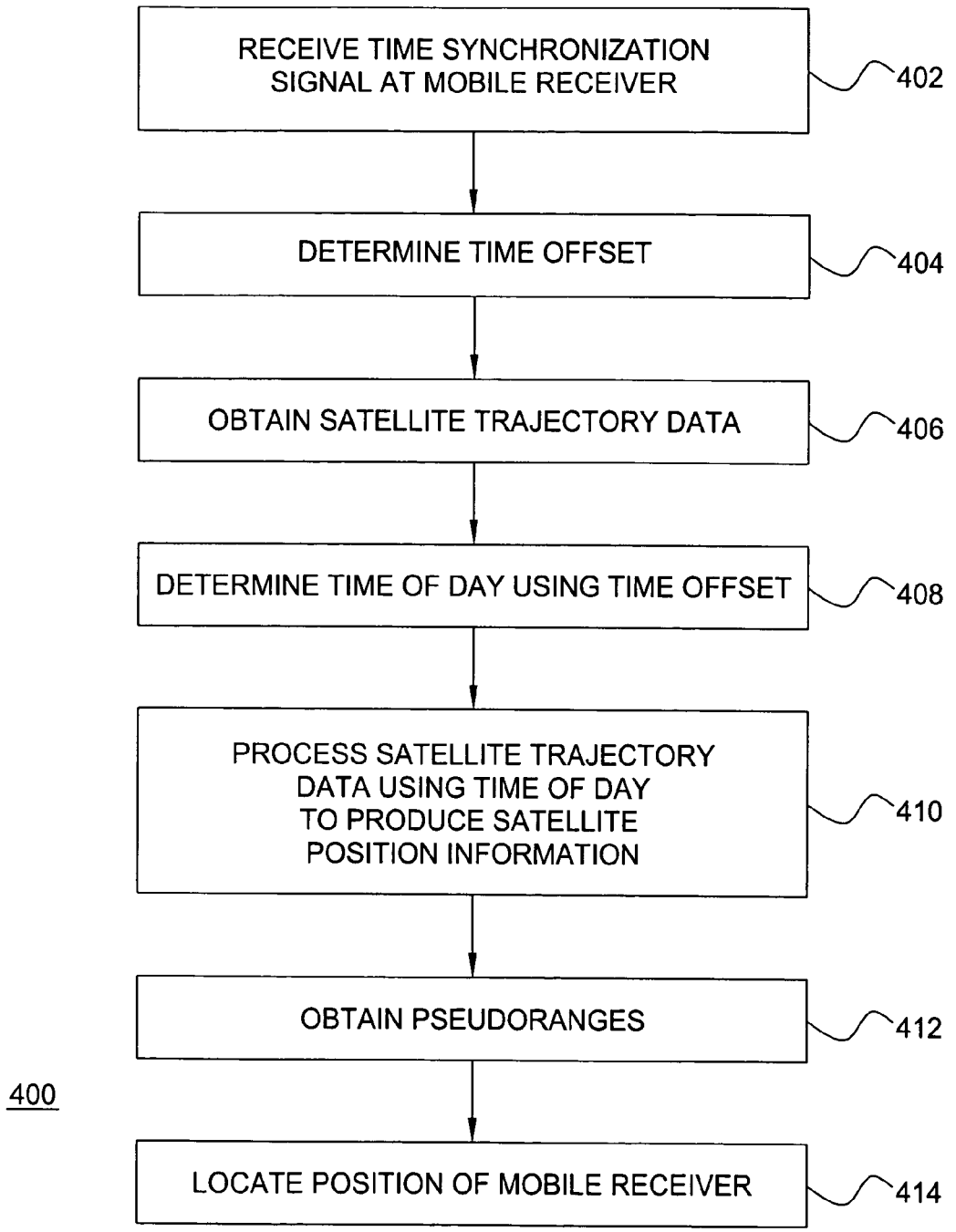
FIG. 4 is a flow diagram depicting another exemplary embodiment of a method for processing satellite signals in a mobile receiver in accordance with the invention.

FIG. 4 is a flow diagram depicting another exemplary embodiment of a method 400 for processing satellite signals in a mobile receiver in accordance with the invention. Aspects of the method 400 may be understood with simultaneous reference to FIGS. 1, 2, and 4. The method 400 begins at step 402, where a time synchronization signal is received at the mobile receiver 102. The time synchronization signal is obtained using the receive-only cellular acquisition receiver 205. Thus, the mobile receiver 102 does not require a subscription to the cellular network 122 and may employ less complex and costly circuitry as compared to a full communication transceiver.

At step 404, a time offset is determined. At step 406, satellite trajectory data is obtained at the mobile receiver 102. For example, the satellite trajectory data may be obtained from the server 104 via the cellular network 106 or the communication network 122. At step 408, a time of day is determined using an absolute component of the time offset determined at step 404. Notably, the absolute component of the time offset may be used in conjunction with the local time keeping counter 222 to provide time of day. At step 410, the satellite trajectory data is processed using the time of day to produce satellite position information. At step 412, pseudoranges are obtained by the mobile receiver 102. At step 414, position of the mobile receiver 102 is located using the pseudoranges and the satellite position information.

In the preceding discussion, the invention has been described with reference to application upon the United States Global Positioning System (GPS). It should be evident, however, that these methods are equally applicable to similar satellite systems, and in particular, the Russian GLONASS system, the European GALILEO system, combinations of these systems with one another, and combinations of these systems and other satellites providing similar signals, such as the wide area augmentation system (WAMS) and SBAS that provide GPS-like signals. The term "GPS" used herein includes such alternative satellite positioning systems, including the Russian GLONASS system, the European GALILEO system, the WAAS system, and the SBAS system, as well as combinations thereof.

While the foregoing is directed to embodiments of the present invention, other and further embodiments of the invention may be devised without departing from the basic scope thereof, and the scope thereof is determined by the claims that follow.

The invention claimed is:

1. A method of processing satellite positioning system signals, comprising:
   receiving assistance data at a mobile receiver from a first wireless cellular network using a wireless cellular transceiver;
   obtaining a time synchronization signal from a second wireless cellular network at said mobile receiver using a wireless cellular receiver;
   determining a time offset in response to said time synchronization signal, wherein the time offset is based on a signal propagation delay between the second wireless cellular network and the mobile receiver;
   processing satellite signals at said mobile receiver using said assistance data and said time offset.

2. The method of claim 1, wherein said step of processing comprises:
   obtaining expected pseudorange data in response to said assistance data;
   determining expected code delay windows using said expected pseudorange data and a sub-millisecond portion of said time offset; and
   correlating said satellite signals in response to said expected code delay windows to produce correlation results.

3. The method of claim 2, further comprising:
   coherently averaging said correlation results in response to said time offset to synchronize to navigation data bits.

4. The method of claim 2, further comprising:
   computing pseudoranges in response to said correlation results.

5. The method of claim 4, further comprising:
   sending said pseudoranges to a server using said first wireless cellular network and said wireless cellular transceiver; and
   locating position of said mobile receiver at said server in response to said pseudoranges.

6. The method of claim 4, further comprising:
   processing satellite trajectory data within said mobile receiver using an absolute portion of said time offset to produce satellite position data; and
   locating position of said mobile receiver in response to said pseudoranges and said satellite position data.

7. The method of claim 1, wherein said first wireless cellular network comprises a non-synchronized cellular network and said second wireless cellular network comprises a synchronized cellular network.

8. The method of claim 1, wherein said time synchronization signal is obtained without a subscription to said wireless network.

9. A mobile receiver, comprising:
a wireless cellular transceiver for communicating with a first cellular network;
a cellular acquisition receiver for receiving a time synchronization signal from a second wireless cellular network;
a satellite signal receiver for receiving satellite signals from satellite positioning system satellites;
a local clock in communication with said satellite signal receiver; and
a processor for determining a time offset between local time output by said local clock and satellite time output by said satellite positioning system satellites in response to said time synchronization signal, wherein the time offset is based on a signal propagation delay between the second wireless cellular network and the mobile receiver.

10. The mobile receiver of claim 9, wherein said processor is further configured to determine expected code delay windows using a sub-millisecond portion of said time offset and expected pseudorange data obtained via said wireless cellular transceiver.

11. The mobile receiver of claim 10, further comprising:
correlator circuitry for correlating said satellite signals in response to said expected code delay windows to produce correlation results.

12. The mobile receiver of claim 11, wherein said correlator circuitry is configured to coherently average said correlation results in response to said time offset to synchronize to navigation data bits.

13. The apparatus of claim 11, wherein said processor is further configured to computer pseudoranges in response to said correlation results.

14. The apparatus of claim 13, wherein said processor is further configured to process satellite trajectory data using an absolute portion of said time offset to produce satellite position data, and locate position of said mobile receiver in response to said pseudoranges and said satellite position data.

15. The apparatus of claim 9, wherein said first wireless cellular network comprises a non-synchronized cellular network and said second wireless cellular network comprises a synchronized cellular network.

16. The apparatus of claim 9, wherein said cellular acquisition receiver is configured to obtain said time synchronization signal without a subscription to said second wireless cellular network.

17. A position location system, comprising:
a server for providing assistance data;
a mobile receiver, including:
a wireless cellular transceiver for communication with said server through a first wireless cellular network;
a cellular acquisition receiver for receiving a time synchronization signal from a ground based transmitter of a second cellular network;
a satellite signal receiver for receiving satellite signals from satellite positions system satellites;
a local clock in communication with said satellite signal receiver; and
a processor for determining a time offset between local time output by said local clock and satellite time output by said satellite positioning system satellites in response to said time synchronization signal, wherein the time offset is based on a signal propagation delay between the second wireless cellular network and the mobile receiver.

18. The system of claim 17, wherein said first wireless cellular network comprises a non-synchronized cellular network and said second wireless cellular network comprises a synchronized cellular network.

19. The mobile receiver of claim 9, wherein the mobile receiver is operable to receive CDMA signals.

20. The method of claim 1, further comprising:
receiving long term satellite trajectory model from the first wireless network.

21. The method of claim 20, wherein the long term satellite trajectory model from the first wireless network is valid for longer than ephemeris data.

22. The method of claim 1, wherein determining a time offset further comprises measuring the round trip delay for a signal being transmitted from the base station to the mobile station.

23. The method of claim 1, wherein obtaining a time synchronization signal further comprises obtaining a time synchronization signal from a ground based transmitter of a second wireless cellular network at said mobile receiver.

24. The mobile receiver of claim 9, wherein the cellular acquisition receiver for receiving a time synchronization signal receive the time synchronization signal from a ground based transmitter of a second wireless cellular network.

* * * * *